(12) United States Patent
Herzog et al.

(10) Patent No.: US 11,945,159 B2
(45) Date of Patent: Apr. 2, 2024

(54) METHOD AND APPARATUS FOR CONTROLLING THE EXPOSURE OF A SELECTIVE LASER SINTERING OR LASER MELTING APPARATUS

(71) Applicant: Concept Laser GmbH, Lichtenfels (DE)

(72) Inventors: Frank Herzog, Lichtenfels (DE); Florian Bechmann, Lichtenfels (DE); Markus Lippert, Lichtenfels (DE); Johanna Hoch, Breitbrunn (DE); Alexey Tarasov, Redwitz an der Rodach (DE); Fabian Zeulner, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 583 days.

(21) Appl. No.: 17/072,137

(22) Filed: Oct. 16, 2020

(65) Prior Publication Data

US 2021/0101333 A1    Apr. 8, 2021

Related U.S. Application Data

(60) Continuation of application No. 16/007,813, filed on Jun. 13, 2018, now Pat. No. 10,836,103, which is a (Continued)

(30) Foreign Application Priority Data

Nov. 12, 2014    (DE) .................. 1102014016679.1

(51) Int. Cl.
*B29C 64/153*    (2017.01)
*B22F 10/00*    (2021.01)
(Continued)

(52) U.S. Cl.
CPC ............ *B29C 64/153* (2017.08); *B22F 10/00* (2021.01); *B22F 10/28* (2021.01); *B22F 10/366* (2021.01);
(Continued)

(58) Field of Classification Search
None
See application file for complete search history.

(56) References Cited

U.S. PATENT DOCUMENTS 4,469,442 A    9/1984    Reich
4,555,179 A    11/1985   Langerholc et al.
(Continued)

FOREIGN PATENT DOCUMENTS

CN    101107882 A    1/2006
CN    103978307 A    8/2014
(Continued)

OTHER PUBLICATIONS

Chinese Search Report Corresponding to CN2015800613179 dated Aug. 15, 2018.
(Continued)

*Primary Examiner* — Geoffrey S Evans
(74) *Attorney, Agent, or Firm* — Dority & Manning, P.A.

(57) ABSTRACT

A method of additively manufacturing a three-dimensional object may include allocating irradiation of respective ones of a plurality of sequential layers of construction material between a first region and a second region based at least in part on a first irradiation time and/or a second irradiation time. Irradiation of the first region is allocated to a first scanner and the first irradiation time is indicative of a time required for the first scanner to irradiate the first region with respect to at least one of the plurality of sequential layers of construction material. Irradiation of the second region is allocated to a second scanner and the second irradiation time
(Continued)

is indicative of a time required for the second scanner to irradiate the second region with respect to at least one of the plurality of sequential layers of construction material. The first irradiation time and the second irradiation time may be at least approximately the same.

20 Claims, 2 Drawing Sheets

Related U.S. Application Data division of application No. 15/526,711, filed as application No. PCT/EP2015/075832 on Nov. 5, 2015, now Pat. No. 10,137,633.

(51) Int. Cl.
| | | |
|---|---|---|
| B22F 10/28 | (2021.01) | |
| B22F 10/366 | (2021.01) | |
| B22F 12/49 | (2021.01) | |
| B23K 26/06 | (2014.01) | |
| B23K 26/08 | (2014.01) | |
| B29C 64/277 | (2017.01) | |
| B29C 64/393 | (2017.01) | |
| B33Y 10/00 | (2015.01) | |
| B33Y 30/00 | (2015.01) | |
| B33Y 50/02 | (2015.01) | |
| G02B 26/10 | (2006.01) | |
| H01S 3/101 | (2006.01) | |
| H01S 3/102 | (2006.01) | |
| B22F 12/90 | (2021.01) | |

(52) U.S. Cl.
CPC .......... *B22F 12/49* (2021.01); *B23K 26/0604* (2013.01); *B29C 64/277* (2017.08); *B29C 64/393* (2017.08); *B33Y 10/00* (2014.12); *B33Y 30/00* (2014.12); *B33Y 50/02* (2014.12); *G02B 26/10* (2013.01); *H01S 3/101* (2013.01); *H01S 3/102* (2013.01); *B22F 12/90* (2021.01); *Y02P 10/25* (2015.11)

(56) References Cited

U.S. PATENT DOCUMENTS

| | | | |
|---|---|---|---|
| 5,574,215 | A | 11/1996 | Bunger et al. |
| 5,615,013 | A | 3/1997 | Rueb et al. |
| 5,724,140 | A | 3/1998 | Haywood |
| 6,437,357 | B1 | 8/2002 | Weiss et al. |
| 7,151,603 | B2 | 12/2006 | Kellie |
| 8,229,204 | B2 | 7/2012 | Wagner |
| 8,836,936 | B2 | 9/2014 | Lin |
| 8,897,111 | B1 | 11/2014 | Dekker |
| 8,913,251 | B2 | 12/2014 | Tin |
| 9,682,345 | B2 | 6/2017 | Gromala et al. |
| 9,909,997 | B2 | 3/2018 | Li et al. |
| 10,137,633 | B2 | 11/2018 | Herzog et al. |
| 2003/0052105 | A1 | 3/2003 | Nagano |
| 2007/0175875 | A1 | 8/2007 | Uckelmann et al. |
| 2007/0284547 | A1 | 12/2007 | Sejersen et al. |
| 2008/0131104 | A1 | 6/2008 | Philippi |
| 2013/0264750 | A1* | 10/2013 | Hofacker .............. B22F 12/226 425/174 |
| 2013/0270750 | A1* | 10/2013 | Green .................. B29C 64/268 264/497 |
| 2014/0198365 | A1 | 7/2014 | Li |
| 2014/0263209 | A1 | 9/2014 | Burris |
| 2015/0210013 | A1 | 7/2015 | Teulet |
| 2015/0283612 | A1 | 10/2015 | Maeda |
| 2016/0082668 | A1 | 3/2016 | Perret et al. |
| 2016/0114432 | A1 | 4/2016 | Ferrar et al. |
| 2017/0348905 | A1 | 12/2017 | Fey |
| 2018/0257140 | A1 | 9/2018 | Pontiller-Schymura et al. |
| 2018/0370131 | A1 | 12/2018 | Ishikawa et al. |
| 2019/0039318 | A1 | 2/2019 | Madigan et al. |
| 2019/0047226 | A1 | 2/2019 | Ishikawa et al. |
| 2020/0114580 | A1 | 4/2020 | Hunze et al. |
| 2020/0156319 | A1 | 5/2020 | Dohler |

FOREIGN PATENT DOCUMENTS

| | | |
|---|---|---|
| CN | 104010749 A | 8/2014 |
| DE | 102012014839 A1 | 1/2014 |
| DE | 102012014840 A1 | 1/2014 |
| DE | 102013208651 A1 | 10/2015 |
| DE | 102014005916 A1 | 10/2015 |
| EP | 2186625 A2 | 5/2010 |
| JP | 2000/263650 A | 9/2000 |
| JP | 2000/313067 A | 11/2000 |
| JP | 2002/144437 A | 5/2002 |
| JP | 3515419 B2 | 4/2004 |
| JP | 2007/536598 A | 12/2007 |
| JP | 2009/006509 A | 1/2009 |
| WO | WO2005/106588 A1 | 11/2005 |
| WO | WO2014/180971 A | 11/2014 |
| WO | WO2014/199134 A1 | 12/2014 |

OTHER PUBLICATIONS

European Office Action Corresponding EP18166334 dated Jul. 7, 2020.
Japanese Office Action Corresponding to JP2017525577 dated Sep. 27, 2018.
PCT International Search Report Corresponding to PCT/EP2015/075832 dated Feb. 19, 2016.
Combined Chinese Search Report and Office Action Corresponding to Application No. 201910355834 dated Oct. 9, 2020.
Collocott et al., Dictionary of Science and Technology, Revised Edition , Edinburgh, 1974, pp. 200-201.
Gebhardt, "Generative Fertigungsanlagen", Generative Fertigungsverfahren Rapid Prototyping-Rapid Tooling-Rapid Manufacturing, Germany, Oct. 2007, p. 122.
Lilienfeld, "Optical Detection of Particle Contamination on Surfaces: A Review", Aerosol Science and Technology, Jan. 1986, 145-162.
Grimm, "Selective Laser Sintering, User's Guide Rapid Protyping", United States of American, Jan. 2004, pp. 166.
Voltz, "Computerwissen von A bis Z Eine komprimierte Fachbegriffesammlung", Computer-Fachbegriffe Von A Bis Z, Germany, 1987, pp. 154-157.

* cited by examiner

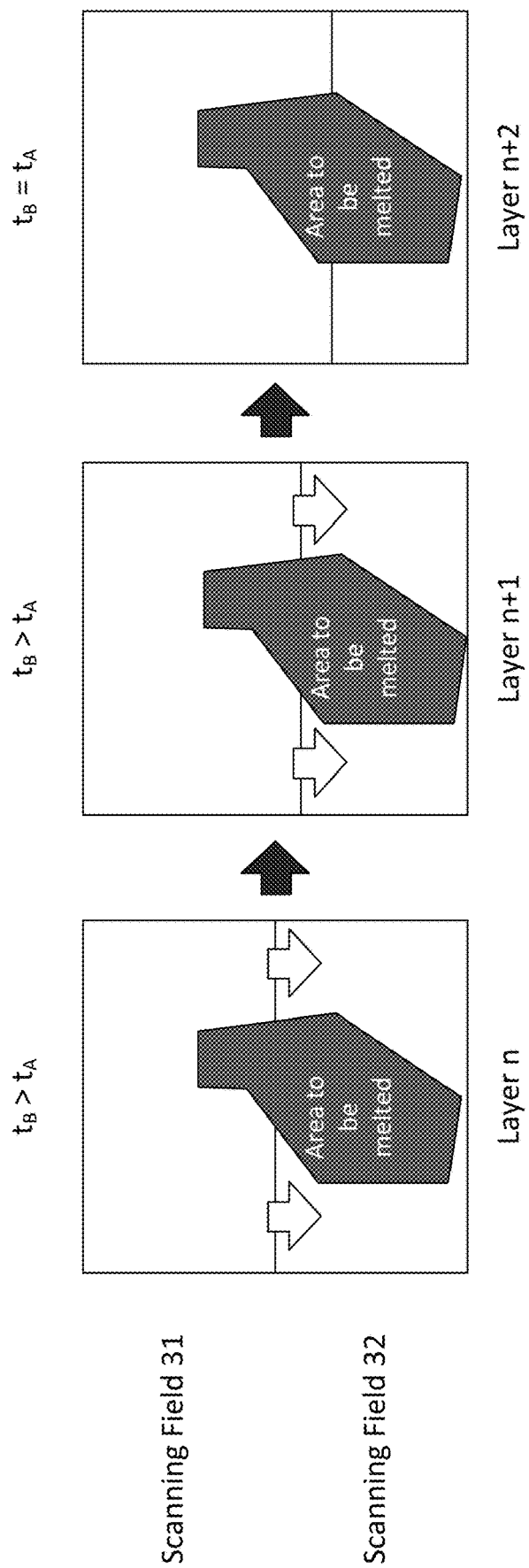

METHOD AND APPARATUS FOR CONTROLLING THE EXPOSURE OF A SELECTIVE LASER SINTERING OR LASER MELTING APPARATUS

CROSS-REFERENCE TO RELATED APPLICATIONS

This application is a continuation of U.S. application Ser. No. 16/007,813, filed Jun. 13, 2018, which is a divisional of U.S. application Ser. No. 15/526,711, filed May 12, 2017, which is a national-stage entry under 35 U.S.C. 371 of International Application No. PCT/EP2015/075832, filed Nov. 5, 2015, which claims priority to German Application No. 102014016679.1, filed Nov. 12, 2014, the contents of each of which are incorporated herein by reference in their entirety as if set forth verbatim.

BRIEF DESCRIPTION OF THE DRAWINGS

Exemplary embodiments of the present disclosure are described with reference to the Figures, in which:

FIGS. 2A-2C show diagrams for scanning field adjustments, in FIG. 2A shows a first layer (layer n), FIG. 2B shows another layer (layer n+1), and FIG. 2C shows yet another layer (layer n+2).

DETAILED DESCRIPTION

Figure 1:
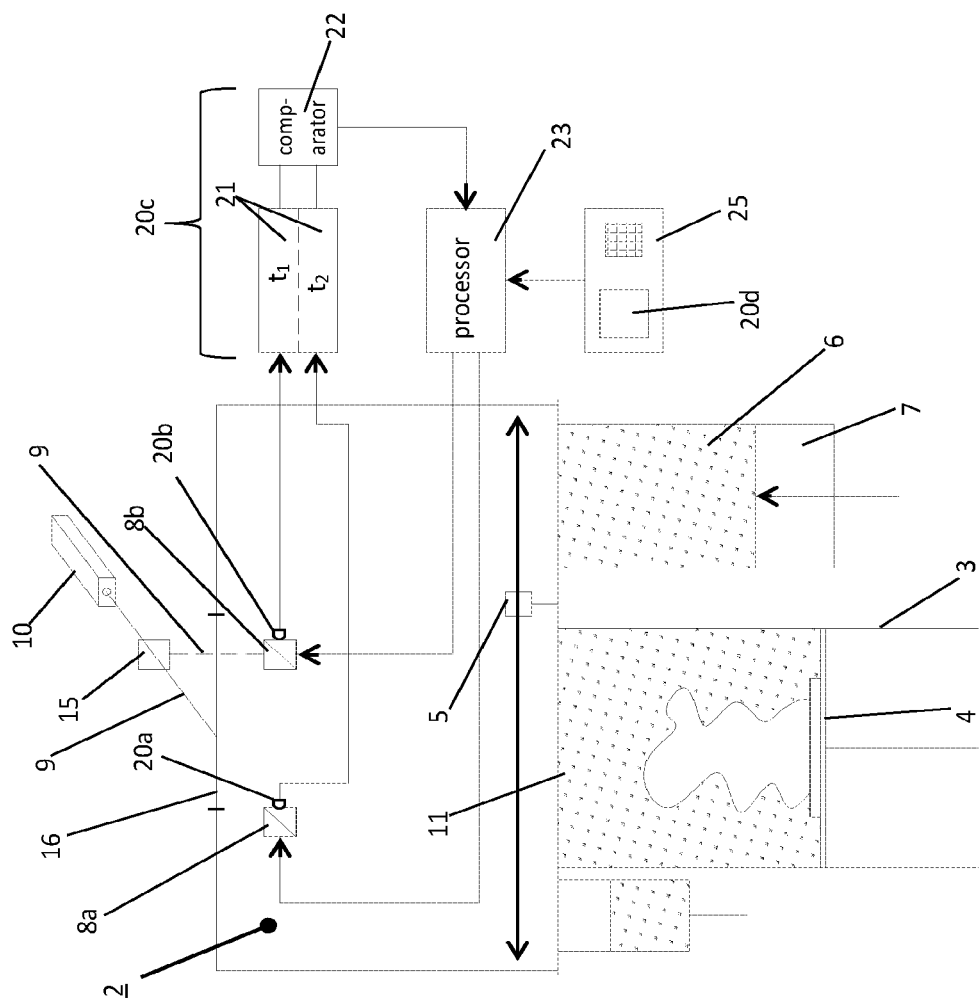
FIG. 1 shows a schematic diagram of the significant components of an apparatus for performing the method.

The present disclosure relates to a method for controlling the exposure of a selective laser sintering or laser melting apparatus for manufacturing three-dimensional objects. Furthermore, the present disclosure relates to an apparatus for performing the method.

From DE 10 2014 005 916.2 it is known as prior art to use laser sintering or laser melting apparatuses that can be used to manufacture three-dimensional objects by selective irradiation of a construction material, with a plurality of scanners. The scanners are arranged above a construction field and can be either fixedly or movably arranged, i.e. can be moved across the construction field section by section.

In such multi-scanner systems either each portion of a construction field is assigned a separate scanner or the scanners are installed or formed such that they can at least partially expose construction field portions to which another scanner is assigned to support this other scanner in exposing the construction field portion assigned to it, if there the exposure effort in time or area is significantly higher than in the adjacent construction field portion which is to be exposed respectively less.

The present disclosure is based on the object of providing a method and an apparatus for performing this method, enabling an optimization of the construction process and especially a reduction of the required construction time for an object.

In the course of the method according to the present disclosure, the irradiation times of each individual scanner and/or the irradiation areas detected by said individual scanner are at first separately detected and stored in a first step. The detection of the irradiation times can, for example, be determined by a shutter opening signal, said shutter letting radiation energy of a radiation source pass, but other detecting possibilities are also imaginable, e.g. by light sensitive elements or the like, which provide a time signal when activating a scanner that can be electronically stored.

The detection of the irradiation areas can also be performed in different ways, either with photographic technology by detecting an irradiation image in a certain time segment or by use of irradiation times and scanner deflections already determined such that irradiated construction field portions can be determined regarding their irradiated size.

In a second step, the detected and stored irradiation time values and irradiation area values are electronically compared with each other. This can be performed by a comparator that is integrated in an appropriately suited processor or computer.

When the processor/computer determines that the irradiation times or areas deviate from each other, than for the next layer or for a next layer portion a new layout of the surface sections of a powder layer to be irradiated by each individual scanner is determined such that the irradiation times for each individual scanner are possibly approximated to each other and/or the irradiation areas of each individual scanner are aligned with each other in terms of surface area to the largest extend possible.

Said method is performed iteratively, i.e. is repeated again and again, to be able to quickly react accordingly to irradiation geometries changing during the construction process. The subdivision of scanning fields is in each case dynamically adjusted after solidification of one or more layers such that the exposure time for each scanner resulting in each subsequent irradiation course is at least approximately the same. Prior to the construction process, an operator can perform a presetting of the scanning fields for each scanner based on readable control data of the scanners. Of course, it is also possible that an operator quasi-manually intervenes in the iterative approximation of the scanning symbols and quite consciously conducts a displacement of the scanning fields, e.g. for thermal reasons or the like.

It should be suggested that the method according to the present disclosure can also be performed as a "combined method", i.e. that e.g. irradiation times and irradiation areas are measured and e.g. from the irradiation times of a first scanner, the area irradiated by it can be concluded, which is compared with the irradiation areas of a second scanner to achieve the approximation according to the present disclosure.

The border between the scanning fields of two scanners can be a straight line. However, if more than two scanners are used across a construction field, it can be advantageous to also select different courses of the border between the scanning fields.

If the comparison of the irradiation times and/or irradiation areas regarding each scanner results in no displacement of the scanning field borders, then it is very advantageous to have the border between the scanning fields oscillate to avoid striation on the surface.

The control according to the present disclosure adjusts the border between the scanning fields of different scanners in an optimum manner. Though the change of melting area and position is large during an entire construction process, but mostly relatively small from layer to layer, the control is able to bring the construction time closely to the theoretical minimum by small incremental adjustment of the scanning field border throughout the entire construction process.

The apparatus 1 shown in FIG. 1 comprises as significant components a process chamber 2, in which a construction container 3 with a height adjustable construction platform 4 is arranged. Above the construction platform 4 a coating assembly 5 is arranged by which construction material 6 from a metering chamber 7 in the section of the construction container 3 can be applied in the form of thin layers. Above the construction container 3 in the process chamber 2 a plurality of scanners Sa, Sb is arranged by which the radiation 9 of a radiation source 10 can be directed to the construction material layer 11 in the form of a laser in a process-controlled manner to solidify said layer.

The components of the apparatus mentioned are only the components significant to the present disclosure, of course, such a laser sintering or laser melting device comprises a plurality of other components that do not need to be explained in the context of the present disclosure.

The apparatus further has an electronic detection unit 20 by means of which the irradiation times related to every individual scanner S and/or the irradiation areas detected by a scanner S in an irradiation step can separately be detected and stored in an electronic storage 21.

An electronic comparator 22 is connected to the storage 21, by which the stored irradiation time values of the individual scanners S can be compared with each other. A processor device 23 is connected with the comparator 22, which in case of deviating irradiation time values of the individual scanners S calculates a re-determination of the surface sections to be exposed by each individual scanner S such that the irradiation times (or the irradiation areas) of each individual scanner S are aligned with each other in terms of surface area to the largest extend possible.

Furthermore, in FIG. 1 an input apparatus 25 having a display 26 is illustrated, by which an operator is able to intervene in the construction process of the laser sintering or laser melting apparatus 1.

It should be briefly noted that the radiation 9 of the radiation source 10 in the illustrated exemplary embodiment is directed via a beam splitter 15 and from there penetrates a window 16 in the upper section of the process chamber 2 to get to the scanners Sa, Sb.

The detection unit 20 comprises sensor elements on the scanners or optical switches (shutters) connected upstream said scanners, which detect the irradiation times of the scanners S and store them as irradiation time values T1 and T2 to be compared into storage 21. Said values are compared with each other in the comparator 22 to enable an optimization of the drive of the scanners by the processor.

People skilled in the art know that on the one hand the detection of irradiation times can be replaced or supplemented by a detection of irradiation areas, that the storage and the comparator can be part of an electronic system for operating the apparatus and can be integrated in a computer or a processor.

In FIGS. 2A-2C, it is explained in more detail how the optimization of the scanning fields 31, 32 or the irradiation areas related to the individual scanners Sa, Sb is optimized.

In FIG. 2A, at first a state is shown in which the area of the scanning field 32 to be molten is larger than that of the scanning field 31. For this reason, it is purposeful to shift the border 30 between the scanning field 31 and the scanning field 32 downwards such that in the next layer n+1 according to FIG. 2B an approximation of the scanning fields 31, 32 has already been conducted.

This process is repeated until the scanning fields 31 and 32 are actually the same size, i.e. the irradiation times tA and tb are aligned with each other such that both scanners Sa and Sb are at least widely working at the same capacity.

If the comparative measurement of the irradiation times or scanning field sizes results in the border 30 between the scanning fields not needing to be shifted, because the irradiation times are aligned with each other, then an oscillation of the border 30 between the scanning fields 31, 32 is performed to avoid striation in the component.

LIST OF REFERENCE NUMBERS

1. Apparatus
2. Process chamber
3. Construction container
4. Construction platform
5. Coating assembly
6. Construction material
7. Metering chamber
8. Scanner
9. Radiation
10. Radiation source
11. Construction material layer
15. Beam splitter
20. Detection unit
21. Storage
22. Comparator
23. Processor device
25. Input apparatus
26. Display
30. Border
31. Scanning field
32. Scanning field

The invention claimed is:

1. A method of additively manufacturing a three-dimensional object, the method comprising:
   allocating irradiation of respective ones of a plurality of sequential layers of construction material between a first region and a second region based at least in part on a first irradiation time and/or a second irradiation time;
   wherein irradiation of the first region is allocated to a first scanner and the first irradiation time is indicative of a time required for the first scanner to irradiate the first region with respect to at least one of the plurality of sequential layers of construction material;
   wherein irradiation of the second region is allocated to a second scanner and the second irradiation time is indicative of a time required for the second scanner to irradiate the second region with respect to at least one of the plurality of sequential layers of construction material; and
   wherein the first irradiation time and the second irradiation time are at least approximately the same.

2. The method of claim 1, comprising:
   allocating irradiation of the respective ones of the plurality of sequential layers of construction material between the first region and the second region based at least in part on a first surface area of the first region and/or a second surface area of the second region such that the first surface area and the second surface area are at least approximately the same size.

3. The method of claim 1, comprising:
   allocating irradiation of one or more subsequent ones of the plurality of sequential layers of construction material between the first region and the second region based at least in part on the first irradiation time and/or the second irradiation time such that the first irradiation time and the second irradiation time are aligned with one another;
   wherein the first irradiation time is indicative of a time required for the first scanner to irradiate the first region with respect to one or more preceding ones of the plurality of sequential layers of construction material; and wherein the second irradiation time is indicative of a time required for the second scanner to irradiate the second region with respect to one or more preceding ones of the plurality of sequential layers of construction material.

4. The method of claim 1, comprising:
determining the first irradiation time and/or the second irradiation time at least in part using an electronic detection unit.

5. The method of claim 4, wherein the electronic detection unit comprises a sensor element or an optical switch.

6. The method of claim 4, comprising:
comparing the first irradiation time with the second irradiation time at least in part using an electronic comparator.

7. The method of claim 4, comprising
determining a comparison of the first irradiation time with the second irradiation time; and
re-allocating irradiation of one or more subsequent ones of the plurality of the sequential layers of construction material between the first region and the second region based at least in part on the comparison of the first irradiation time with the second irradiation time.

8. The method of claim 7, wherein for the one or more subsequent ones of the plurality of the sequential layers of construction material, the first irradiation time aligns with the second irradiation time and the first region and the second region have at least approximately the same surface area.

9. The method of claim 1, wherein the first region is located in an upper scanning field and the second region is located in a lower scanning field, and wherein a border delineates the first region from the second region and/or wherein the border delineates the upper scanning field from the lower scanning field.

10. The method of claim 9, comprising:
dynamically adjusting the border after irradiating respective ones of the plurality of sequential layers of construction material such that the first irradiation time and the second irradiation time are at least approximately the same for respective ones of the plurality of sequential layers of construction material.

11. The method of claim 1, comprising:
allocating irradiation of the respective ones of the plurality of sequential layers of construction material between the first region and the second region based at least in part on readable control data from the first scanner and/or the second scanner.

12. The method of claim 11, comprising:
allocating irradiation of the respective ones of the plurality of sequential layers of construction material between the first region and the second region at least in part by determining a location for a border that delineates the first region from the second region.

13. The method of claim 12, comprising:
allocating irradiation of the respective ones of the plurality of sequential layers of construction material between the first region and the second region such that a first surface area of the first region and a second surface area of the second region are at least approximately the same size.

14. The method of claim 12, comprising:
receiving an input from an operator, the input from the operator configured to determine the location of the border.

15. The method of claim 12, comprising:
adjusting the location of the border in incremental steps corresponding to at least some of the respective ones of the plurality of sequential layers of construction material.

16. The method of claim 15, wherein the border comprises a straight line.

17. The method of claim 15, comprising:
oscillating a location of the border corresponding to at least some of the respective ones of the plurality of sequential layers of construction material.

18. The method of claim 1, comprising:
causing the first scanner and/or the second scanner to perform a pre-exposure.

19. The method of claim 18, comprising:
causing the first scanner to perform a pre-exposure of at least a portion of the second region, and/or causing the second scanner to perform a pre-exposure of at least a portion of the first region.

20. A non-transitory computer-readable medium comprising computer-executable instructions, which when executed by a processor associated with an additive manufacturing machine, cause the additive manufacturing machine to perform a method of additively manufacturing a three-dimensional object, the method comprising:
allocating irradiation of respective ones of a plurality of sequential layers of construction material between a first region and a second region based at least in part on a first irradiation time and/or a second irradiation time;
wherein irradiation of the first region is allocated to a first scanner and the first irradiation time is indicative of a time required for the first scanner to irradiate the first region with respect to at least one of the plurality of sequential layers of construction material;
wherein irradiation of the second region is allocated to a second scanner and the second irradiation time is indicative of a time required for the second scanner to irradiate the second region with respect to at least one of the plurality of sequential layers of construction material; and
wherein the first irradiation time and the second irradiation time are at least approximately the same.

* * * * *